UNITED STATES PATENT OFFICE.

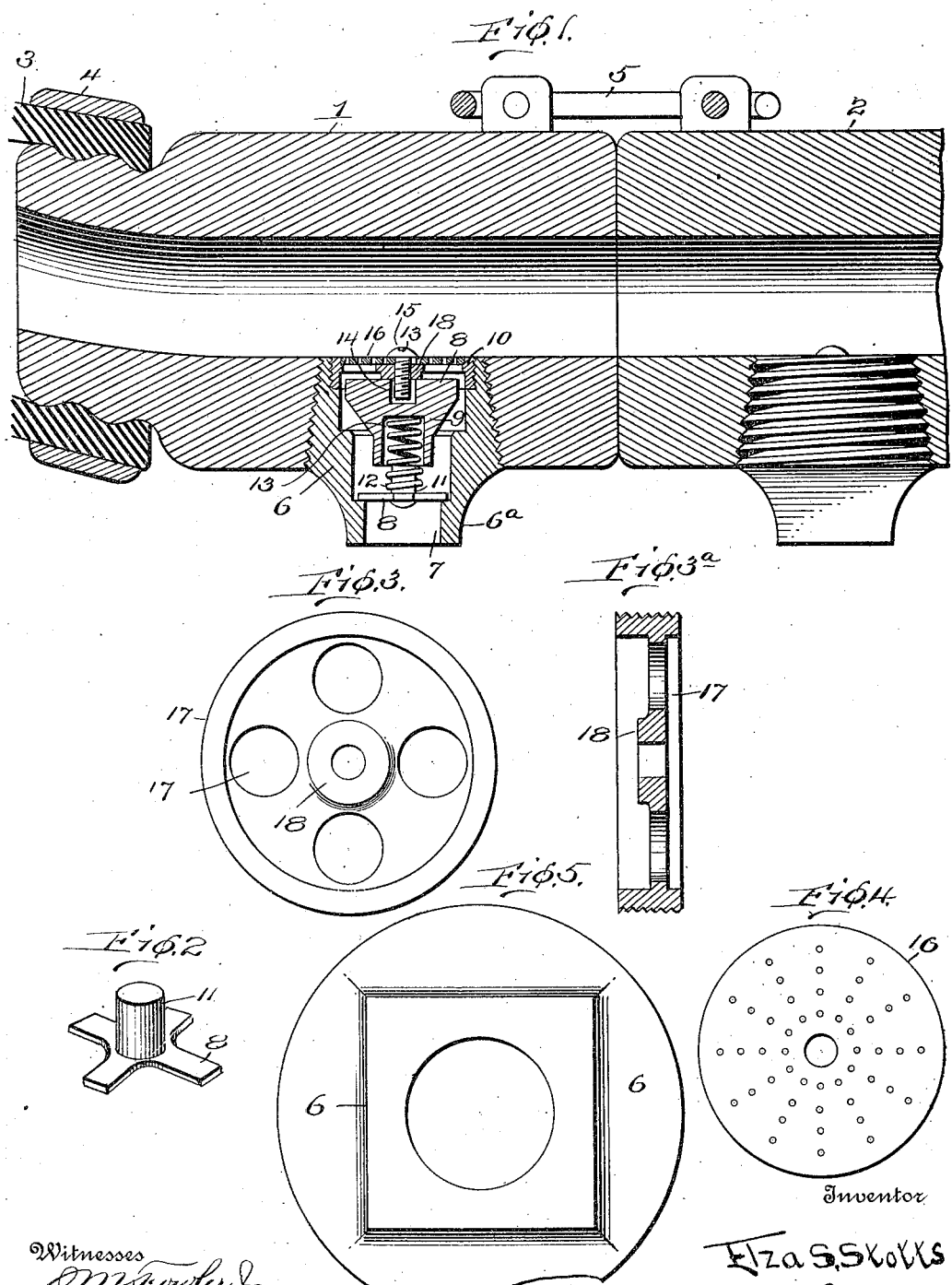

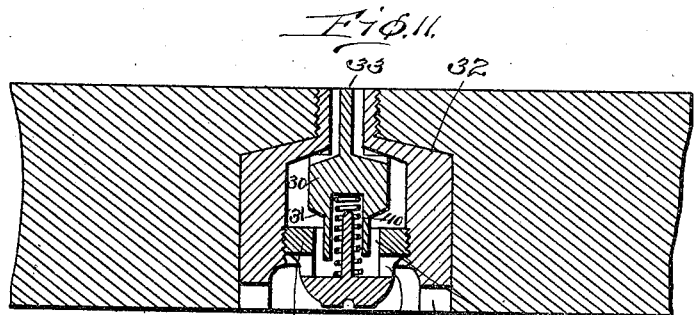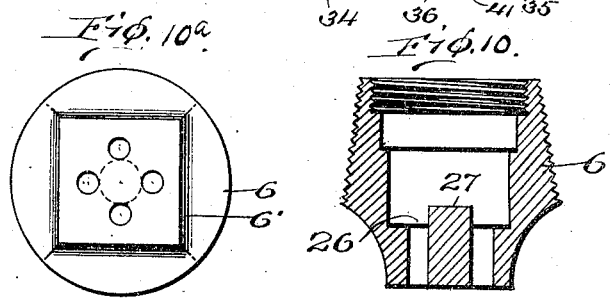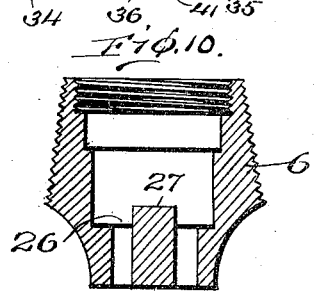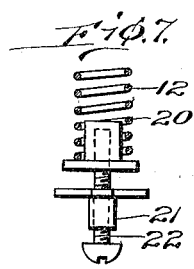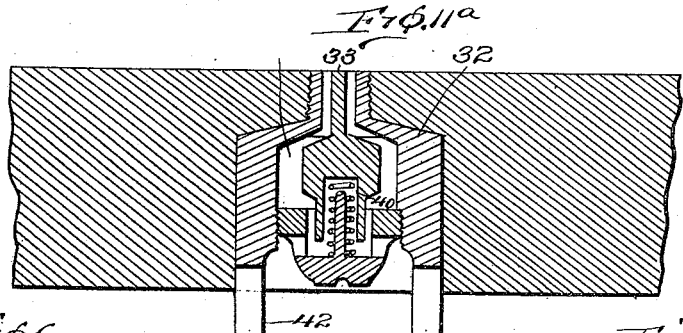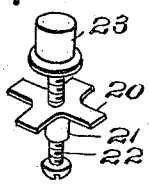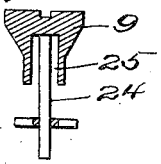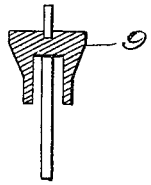

ELZA S. STOTTS, OF MARION, IOWA.

DRAIN-VALVE.

996,600.

Specification of Letters Patent. Patented June 27, 1911.

Application filed April 15, 1910. Serial No. 555,673.

*To all whom it may concern:*

Be it known that I, ELZA S. STOTTS, a citizen of the United States, residing at Marion, in the county of Linn and State of Iowa, have invented certain new and useful Improvements in Drain-Valves; and I do hereby declare the following to be a full, clear, and exact description of the invention, such as will enable others skilled in the art to which it appertains to make and use the same.

This invention relates to new and useful improvements in drain valves for stand pipes, heating systems and the like.

The object of this invention is to provide an automatic bleed for steam pipes or the like when not in use so as to prevent freezing.

Other objects will be apparent from the following specification and drawings thereof in which :—

Figure 1 is a sectional view of the coupling of two drain pipes showing one valve in section and the other in elevation. Fig. 2 is a perspective view of a spider used in the valve. Fig. 3 is a plan of a retaining ring as used in the valve. Fig. 3ª is a sectional view of Fig. 3. Fig. 4 is a plan of the strainer used in conjunction with the retaining ring. Fig. 5 is a bottom plan of the valve. Fig. 6 is a perspective view of a modified form of a spider as used to retain the spring. Fig. 7 is an elevational view of Fig. 6 showing the spring in section. Fig. 8 is a view of a modified form of valve. Fig. 9 is a view of another modification of the valve. Fig. 10 is a sectional view of a modified form of valve seat showing the spring retaining stud integral with said seat. Fig. 10ª is a plan of the modified form of valve seat as shown in Fig. 10. Fig. 11 is a view of a modified form of valve showing means of inserting the valve from the outside. Fig. 11ª is a modified form of Fig. 11 showing studs instead of slots in the valve seat.

Referring to the drawings, there are shown two couplers 1 and 2 having the usual train pipes 3 and clamps 4 assuring positive connections, it being immaterial how said couplings are held together but I have shown such a means as the lugs and link 5. The valve casing as indicated at 6 is inserted in a tap in the couplings and is so arranged as to collect any condensate within the casing. Said casing is drilled or bored as at 7 to four diameters forming three shoulders against which bear the spider 8, the valve 9 and the retaining ring 10. The spider has an upstanding pin or lug 11 which serves as a guide for the spring 12, said spring being in compression between the spider 8 and the bottom of a recess 13 formed in the valve 9, the valve having the usual tapering walls which seat against the shoulder intended to receive it. The valve is also recessed as at 14 to receive the lower end of a bolt 15, said bolt serving as a guide to cause the proper seating of the valve.

The retaining ring 10 is peripherally threaded and inserted into the greatest diameter of the casing 6. The upper face of said ring is recessed for the reception of a strainer 16, said strainer having small perforations preventing any foreign substance entering and making the valve inoperative, the lower face of said ring being recessed to receive the top of the valve 9 but of a slightly larger diameter than the valve. To prevent the valve rising and closing the openings 17 in said retaining ring a boss 18 is left on the lower face of said ring, thereby permitting a circulating space whereby any condensate within the tubes may be bled therefrom. The bolt 15 passes through an opening in the strainer 16 and the threaded opening in the retaining ring 10 and extends downwardly into the recess 14 in the valve 9.

The device as shown in Fig. 6 and Fig. 7 of the drawings permits the spring 12 to be adjusted so as to reduce or increase the compression as desired and consists of the usual spider 20 having a stud 21 extending therefrom, the stud 21 being drilled and internally threaded for the reception of a screw 22 which screw carries a swivel member 23, which member has a body portion which holds and guides the spring and a flange which limits the expansion of said spring.

As shown in Figs. 8 and 9 the valve 9 has a stem 24 extending downwardly through the recess 25, said stem being integral with the valve, and in Fig. 9 I show a stem upstanding from the valve.

Figs. 10 and 10ª disclose a valve casing having the spider integral therewith, the bore being sufficiently deep to leave a head 26 which has a plurality of smaller openings 27 and a stud 28 to hold the spring.

In Figs. 11 and 11ª arrangement is provided permitting the alteration of the several parts without removing the casing from the coupling, the casing 32 being drilled to several diameters forming several shoulders as in the other form, the valve 30 having a fluted stem 33 extending upwardly into the smallest of the bores of the casing, the fluting on the stem extending over the valve thereby permitting the air to flow out. The valve has the tapered wall 31 which seats against the ring 34 which is threaded and screwed into the casing. The ring 34 has two openings, a vertical one 35 and a horizontal one 36 communicating from the atmosphere to the chamber 37 in said casing. The ring 34 has the stud 38 which guides the spring 39 at one end while its opposite end is held in the recess 40 formed in the lower end of the valve 31, the outer end of the ring 34 being headed and notched to permit adjustment. The wall of the casing 32 is recessed as at 41 in Fig. 11 or is provided with lugs 42 as shown in Fig. 11ª permitting adjustment as by a wrench. The casing 6 as shown in Fig. 1 has its outer portion 6ª reduced and arranged for the reception of a wrench or the like.

The operation of the valve is as follows: Assuming the pressure within and without as that of the atmosphere, the valves will be as shown in the drawing and any water or accumulation of oil or the like will bleed from the pipes, the spring having been set at a predetermined compression, and assuming that the pressure is applied, the pressure tends to seek the course of the least resistance so tends to pass through the valves carrying any water therewith. As soon as the pressure becomes greater than that of the spring the valves will seat and close the path through the valve casing and will remain so as long as pressure is on. When the pressure is reduced the valves open and bleed all condensate from the pipe, making it impossible for the water to freeze and cause the delay of time to thaw them.

I claim:—

1. In a valve, a casing provided with a central bore, a valve member proper arranged to operate within the casing, an annular member having threaded connection with the bore of the casing, a spider arranged within the annular member, an apertured plate arranged adjacent to the spider, and an annular member constituting a part of the spider and arranged to space the valve member from the spider.

2. In a valve, a casing provided with a central bore, a valve member arranged to operate in the casing, said valve member having a central longitudinal bore closed at one end, a stationary member within the bore of the casing, a lug projecting from the stationary member and a spring engaging said member and projecting into the bore of the valve member whereby said spring is protected by the body portion of the valve member surrounding the spring.

In testimony whereof I affix my signature in presence of two witnesses.

ELZA S. STOTTS.

Witnesses:
R. A. STREETER,
L. O. DICKEY.